Patented May 7, 1940

2,199,711

UNITED STATES PATENT OFFICE 2,199,711

COMPOSITION OF MATTER AND METHOD OF MAKING SAME

Irving E. Muskat, Akron, Ohio, assignor to Pittsburgh Plate Glass Company, Allegheny County, Pa., a corporation of Pennsylvania No Drawing. Application November 26, 1937, Serial No. 176,646

17 Claims. (Cl. 134—58)

This invention relates to pigments and methods of producing the same.

In the preparation of various paint and rubber compositions, it is conventional to incorporate various types of finely divided pigments or fillers into the composition. In general, it is found that it is difficult to disperse these pigments throughout the composition in such a manner that agglomeration and settling out of the pigment is prevented and a substantially homogeneous dispersion is obtained. Accordingly, it has been considered necessary to incorporate certain dispersing agents into the composition along with the pigments, or fillers.

Very often the pigments are produced by precipitation from aqueous suspensions or solutions. As it is generally required that such materials be finely divided, the conditions of precipitation are, in general, carefully controlled to secure a slurry of finely divided pigmentary material. After filtration of such a slurry, it is usually found that the filter cake contains large quantities of water which must be removed in order to provide a satisfactory product. Often if this filter cake is dried without further treatment, the particles thereof agglomerate, thereby producing a product which is nonuniform in particle size, and, at times, this agglomeration occurs to such an extent that the resultant product is unsatisfactory for many purposes.

To prevent such agglomeration, it has been occasionally proposed to treat the pigment with a suitable coating agent prior to drying. The selection of a suitable agent which would be compatible with the paint, rubber, or other compositions in which the pigment is to be incorporated, and which would act as a dispersing agent and as a means to prevent agglomeration during drying, has been a somewhat difficult problem.

In accordance with my invention, I have found that when pigments are treated with sulphur, in the manner hereinafter set forth, the product thereby produced has certain improved pigmentary properties. The mixture often may be found to be less water absorbent than ordinary pigments. If the pigment is naturally alkaline, the sulphur treated pigment is generally less alkaline than original product and if the pigment is to be used as a reinforcing filler in rubber compositions, the presence of the sulphur therein appears to improve the aging characteristics of the rubber. In addition, the treated pigment has improved dispersing properties over those of untreated pigment and if the sulphur is incorporated into an aqueous slurry of a pigment, it may be dried without substantial agglomeration to yield a finely divided material.

If desired, other dispersing agents may also be added to the finely divided product. I have found that nondrying oils such coconut oil, palm oil, lard oil, lard, tallow, sperm oil, cottonseed oil, etc., or higher saturated fatty acids such as palmitic, stearic, or lauric acids or corresponding esters such as the corresponding glycerides are satisfactory for this purpose. If this material is added prior to drying, it assists in the production of a finely divided substantially unagglomerated product.

Various pigmentary materials such as barium carbonate, magnesium carbonate, basic magnesium carbonate, calcium, barium or magnesium sulphate, calcium or magnesium oxalate, zinc sulphate, zinc sulphide, zinc carbonate, etc., may be treated in this manner. The fineness of the crystals will depend largely upon nature of the compound and the care exercised in its precipitation. In general, it is found that the average particle size of pigmentary material is preferably not substantially in excess of one or two microns. In general finely divided pigments having an average particle less than .5 micron are found to be preferable for use in rubber compositions. The sulfur may be incorporated at any convenient time either before, during or after precipitation.

While the invention is especially well adapted to the manufacture of precipitated pigments other substances such as clay may likewise be so treated and dehydrated. Similarly, dry pigments such as calcined titanium dioxide or zinc oxide may be intermixed with sulphur. If desired, dry sulphur may be incorporated in the dry pigments by a suitable mixing process as, for example, by mixing dry sulphur and dry pigment in a ball mill.

The following examples illustrate the invention:

*Example I.*—A calcium silicate slurry containing 200 grams per liter of precipitated silicate having an average particle size of less than one micron was treated with 0.5% of colloidal sulphur, calculated on the basis of anhydrous calcium silicate and, after thorough intermixing, the product was filtered. The filter cake, which contained approximately 50% water, was gradually heated up to a temperature of approximately 350° F. until the cake was dry. The dried product was then ground in a hammer mill and a finely divided product having a particle size of 0.2 to 0.4 microns was produced. This product was readily dispersible in rubber mixtures.

*Example II.*—A similar slurry was mixed with 0.5% coconut oil and 0.5% colloidal sulphur and after drying, a finely divided product which was easily dispersible in rubber, paint or other mixtures was produced.

*Example III.*—Colloidal sulphur in concentrations of about 0.75% was mixed with a slurry containing 210 grams per liter of barium carbonate and the product filtered. The filter cake was heated at 225° F. until the product was dry and a substantially unagglomerated easily dispersible pigmentary material was produced.

The amount of sulphur to be used may be varied within reasonable limits. Usually, it is preferred to use 0.2% or more of sulphur in the mixture but smaller amounts may be permissible in some cases. Small excess concentrations may not be objectionable if the pigment is to be used in a rubber composition since sulphur would be added to the rubber composition in any event. In general, it is preferred to use sulphur concentrations not substantially in excess of 2% but some departure from this concentration is permissible without causing a reduction in the strength of the final rubber product. Concentrations up to about 5% of the coconut oil or other agent may be used but large excesses of the agent should be avoided since otherwise the strength of the rubber product may be decreased.

It is not essential that the sulphur used be in the colloidal state but it is preferred that it be finely divided and in general sulphur which is as fine or finer than the pigment being treated may be used. Colloidal sulphur has been used since it appears to promote the production of a sulphur coating upon the particles themselves. If desired, the dispersing agent and the sulphur may be intermixed prior to their addition to the calcium carbonate but this is not essential and the two materials may be separately added at any convenient point in the manufacture of the pigment, for example, either before, during or after production of the pigment. Pigments coated or mixed with sulphur as herein described may be used as reinforcing pigments in rubber compositions, as fillers for paper products, as pigments for paints, etc.

Although the present invention has been described in connection with the specific details of certain embodiments thereof, it is not intended that such details shall be regarded as limitations upon the scope of the invention except insofar as included in the accompanying claims.

I claim:

1. A method of preparing a substantially dry, substantially unagglomerated, finely divided pigment having an average particle size not substantially in excess of one micron from an aqueous slurry containing said pigment, which comprises mixing a substantial quantity not in excess of about two percent of finely divided sulphur therewith calculated upon the weight of the pigment the average particle size of said sulphur being not in excess of that of said pigment and drying the mixture.

2. A method of preparing a substantially dry, substantially unagglomerated, finely divided pigment having an average particle size not substantially in excess of one micron from an aqueous slurry containing said pigment, which comprises mixing a substantial quantity not in excess of about two percent of finely divided sulphur calculated upon the weight of the pigment the average particle size of said sulphur being not in excess of that of said pigment and a nondrying oil therewith and drying the mixture.

3. The process according to claim 2 wherein the oil is coconut oil.

4. A method of preparing substantially dry, substantially unagglomerated, finely divided barium sulphate having an average particle size not substantially in excess of one micron from an aqueous slurry of said sulphate which comprises adding a substantial quantity not in excess of about 2 percent of finely divided sulphur thereto calculated upon the weight of the barium sulphate, the average particle size of said sulphur being not in excess of that of said barium sulphate and drying the mixture.

5. A composition of matter suitable for use as a pigment comprising a finely divided substantially unagglomerated pigment having an average particle size not substantially in excess of one micron and a substantial quantity not in excess of about 2 percent by weight of sulphur calculated upon the weight of the pigment, the average size of said sulphur being not in excess of that of said pigment.

6. A composition of matter suitable for use as a pigment comprising a finely divided substantially unagglomerated pigment having an average particle size not substantially in excess of one micron and a substantial quantity not in excess of about 2 percent of colloidal sulphur based upon the weight of the pigment.

7. A composition suitable for use as a pigment which comprises finely divided substantially unagglomerated barium sulphate having an average particle size not in excess of one micron as a preponderant ingredient coated with a substantial quantity of not in excess of about 2 percent of colloidal sulphur calculated upon the weight of the barium sulphate.

8. A composition of matter comprising a finely divided substantially unagglomerated pigment having an average particle size not in excess of one micron as the preponderant ingredient coated with a substantial quantity of not in excess of about 2 percent colloidal sulphur based upon the weight of the pigment and a glyceride of a higher fatty acid.

9. A composition of matter comprising a finely divided substantially unagglomerated pigment having an average particle size not in excess of one micron as the preponderant ingredient coated with a substantial quantity of not in excess of about 2 percent colloidal sulphur based upon the weight of the pigment and a nondrying oil.

10. A composition of matter comprising a finely divided substantially unagglomerated pigment having an average particle size not in excess of one micron as the preponderant ingredient coated with a substantial quantity of not in excess of about 2 percent colloidal sulphur based upon the weight of the pigment and coconut oil.

11. A composition of matter comprising a finely divided, substantially unagglomerated pigment having an average particle size not in excess of one micron as the preponderant ingredient coated with a dispersing agent and a substantial quantity not in excess of about 2 percent of finely divided sulphur having an average particle size not in excess of that of said pigment.

12. The composition described in claim 5, wherein the pigment is calcium silicate.

13. The composition described in claim 6, wherein the pigment is calcium silicate.

14. The composition described in claim 5, wherein the pigment is calcium oxalate.

15. The composition described in claim 6, wherein the pigment is calcium oxalate.

16. The composition described in claim 9, wherein the pigment is calcium silicate.

17. The composition described in claim 9, wherein the pigment is calcium oxalate.

IRVING E. MUSKAT.